(12) United States Patent
Itabashi et al.

(10) Patent No.: US 10,739,511 B2
(45) Date of Patent: Aug. 11, 2020

(54) DECORATIVE COMPONENT FOR VEHICLE

(71) Applicant: STANLEY ELECTRIC CO., LTD., Tokyo (JP)

(72) Inventors: Rumi Itabashi, Tokyo (JP); Toshiyuki Kondo, Ichikawa (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 16/428,321

(22) Filed: May 31, 2019

(65) Prior Publication Data

US 2019/0377126 A1    Dec. 12, 2019

(30) Foreign Application Priority Data

Jun. 6, 2018    (JP) .................................. 2018-108477

(51) Int. Cl.
*F21V 8/00*    (2006.01)
(52) U.S. Cl.
CPC .......... *G02B 6/0055* (2013.01); *G02B 6/0068* (2013.01)
(58) Field of Classification Search
CPC ............................ G02B 6/0055; G02B 6/0068
USPC ......................................................... 362/511
See application file for complete search history.

(56) References Cited

U.S. PATENT DOCUMENTS

| | | | | |
|---|---|---|---|---|
| 4,965,950 A * | 10/1990 | Yamada | .................... | B60Q 1/56 362/613 |
| 6,966,684 B2 * | 11/2005 | Sommers | ............. | G02B 6/0036 362/559 |
| 8,764,266 B2 * | 7/2014 | Urtiga | ..................... | G09F 13/18 362/612 |
| 2001/0017774 A1 * | 8/2001 | Ito | ......................... | G02B 6/0031 362/613 |
| 2001/0053072 A1 * | 12/2001 | Takemoto | ......... | G02F 1/133606 362/613 |
| 2005/0024844 A1 * | 2/2005 | Oh | ........................ | G02B 6/0063 362/616 |
| 2005/0135115 A1 * | 6/2005 | Lamb | .................... | G02B 6/0068 362/613 |
| 2006/0221638 A1 * | 10/2006 | Chew | .................... | F21V 29/004 362/613 |
| 2007/0274102 A1 * | 11/2007 | Bohme | .................. | G02B 6/006 362/616 |

(Continued)

FOREIGN PATENT DOCUMENTS

JP        2015-221637 A    12/2015

*Primary Examiner* — Bryon T Gyllstrom
(74) *Attorney, Agent, or Firm* — Kenealy Vaidya LLP

(57) ABSTRACT

A decorative component for a vehicle includes a plurality of light source sections, a housing configured to hold the plurality of light source sections, a light guide member that has a first surface and a second surface that face each other and that is configured to guide light emitted from the plurality of light source sections thereinto, and a plurality of light emitting sections that are provided on the light guide member and that are configured to emit light guided through the light guide member from the first surface as emission pattern light having a predetermined shape, wherein a plurality of pattern forming sections are constituted by the light source section and the light emitting section that correspond to each other, and in each of the pattern forming sections, the light emitting section selectively reflects the light emitted from the corresponding light source section.

16 Claims, 11 Drawing Sheets

(56) References Cited

U.S. PATENT DOCUMENTS

| | | | |
|---|---|---|---|
| 2009/0219734 A1* | 9/2009 | Sawada | G02B 6/006 362/616 |
| 2011/0001693 A1* | 1/2011 | Kim | G02B 6/0068 345/102 |
| 2012/0113155 A1* | 5/2012 | Fang | G02B 6/0055 345/690 |
| 2013/0336004 A1* | 12/2013 | Mulder | G02B 6/006 362/609 |

* cited by examiner

DECORATIVE COMPONENT FOR VEHICLE

CROSS-REFERENCE TO RELATED APPLICATION

Priority is claimed on Japanese Patent Application No. 2018-108477, filed Jun. 6, 2018, the content of which is incorporated herein reference.

BACKGROUND

Field of the Invention

The present invention relates to a decorative component for a vehicle.

Description of Related Art

In the related art, as a decorative component for a vehicle attached to a vehicle, there is an exterior illumination unit configured to emit light of a light source from a design plate that functions as a light guide plate attached to an outer surface of the vehicle (for example, see Japanese Unexamined Patent Application, First Publication No. 2015-221637). In the decorative component for a vehicle, light from the light source can be emitted as a predetermined emission (display) pattern by reflecting the light with a concavo-convex shape partially formed on a back surface side of a design plate.

SUMMARY OF THE INVENTION

However, only a monotonous emission pattern can be expressed by the emission pattern emitted from the above mentioned decorative component for a Vehicle. Here, provision of a new technology that can generate various emission patterns is desired.

An aspect of the present invention is directed to providing a decorative component for a vehicle capable of generating an emission pattern having good appearance by generating various emission pattern lights using a single light guide member.

A decorative component for a vehicle according to an aspect of the present invention includes a plurality of light source sections; a housing configured to hold the plurality of light source sections; a light guide member that has a first surface and a second surface that face each other and that is configured to guide light emitted from the plurality of light source sections thereinto; and a plurality of light emitting sections that are provided on the light guide member and that are Configured to emit light guided through the light guide member from the first surface as emission pattern light having a predetermined shape, wherein a plurality of pattern forming sections are constituted by the light source section and the light emitting section that correspond to each other, and in each of the pattern forming sections, the light emitting section selectively reflects the light emitted from the corresponding light source section.

According to the present invention, a plurality of emission pattern lights having a predetermined shape can be generated in a single light guide member. Among the plurality of pattern forming sections provided on the one light guide member, by selecting the light source section corresponding to an emission (display) pattern desired to be emitted (displayed), only the light emitting section that constitute one emission pattern corresponding to a light entrance direction from the light source section is made to emit light, and the light emitting sections of the pattern forming sections that constitute other patterns are not emitted. For this reason, by selecting a predetermined light source section, a specified emission pattern can be emitted. In this way, the pattern forming sections are provided for each of the emission patterns and the light source section that is made to emit light is selected in order to change the light entrance direction of the light entering the light guide member, and thereby, the plurality of emission pattern lights can be generated using a single light guide member.

Further, it is possible to construct a decorative component for a vehicle capable of enabling various displays by only providing one light guide member and a number of the light source sections corresponding to the number of pieces of display information as components.

In the decorative component for a vehicle according to the aspect of the present invention, the light emitting section of each of the pattern forming sections may be constituted by a plurality of cut sections formed on the second surface, and the plurality of cut sections may have reflecting surfaces configured to reflect the light emitted from the corresponding light source section toward the first surface.

According to the present invention, the light emitting sections that form one emission pattern are constituted by the plurality of cut sections, and the light guided through the light guide member can be reflected toward the first surface of the light guide member and emitted from the first surface by the reflecting surfaces having the cut sections. The plurality of cut sections that constitute the one light emitting section selectively reflect only the light from the corresponding one light source section. For this reason, by changing a processing direction of the reflecting surfaces of the plurality of cut sections for every light emitting section, it is possible to generate the plurality of emission patterns using one light guide member.

In the decorative component for a vehicle according to the aspect of the present invention, each of the reflecting surfaces of the plurality of cut sections may be directed to face the corresponding light source sections, and directions in which each of the reflecting surfaces of the plurality of cut section and the corresponding light source section face each other may be different from each other for each of the pattern forming sections.

According to the present invention, in each of the pattern forming sections, only the light from the corresponding light source sections can be reflected by the reflecting surfaces of the cut sections in the light emitting section. For this reason, light from the light source sections of the other pattern forming sections are not reflected. Accordingly, it is possible to generate the emission pattern lights having different emission patterns in every pattern forming section by switching the light source sections.

In the decorative component for a vehicle according to the aspect of the present invention, when the light guide member is seen in a surface normal direction of the first surface in a plan view, shapes of the emission pattern lights are different from each other, the emission pattern lights being emitted from the light emitting sections for each of the pattern forming sections.

According to the present invention, it is possible to generate a plurality of types of emission pattern lights using one light guide member.

In the decorative component for a vehicle according to the aspect of the present invention, when the light guide member is seen in a surface normal direction of the first surface in a plan view, at least two of the emission pattern lights have the same shape, the emission pattern lights being emitted from the light emitting section for each of the pattern forming sections.

According to the present invention, by turning on the light emitting sections having the same shape to emit light in sequence, since the positions where the emission patters lights are generated in one light guide member can be different from each other, a motion can be added to the emission patterns.

In the decorative component for a vehicle according to the aspect of the present invention, the decorative component for a vehicle may further include a formed object disposed on an emission side of the light guide member, wherein, when the light guide member is seen in a surface normal direction of the first surface in a plan view, the plurality of light emitting sections are disposed at positions adjacent to the formed object.

According to the present invention, by generating the plurality of emission patterns at positions adjacent to the formed object, it is possible to improve the appearance of the formed object by combining the emission patterns.

According to the aspect of the present invention, it is possible to provide a decorative component for a vehicle capable of generating an emission pattern having a good appearance by generating various emission pattern lights using a single light guide member.

DETAILED DESCRIPTION OF THE INVENTION

Hereinafter, a decorative component for a vehicle according to an embodiment of the present invention will be described with reference to the accompanying drawings.

The drawings used in the following description may show enlarged features for convenience in order to make the features easy to understand, and dimensional ratios or the like of components are not necessarily the same as the actual ones.

A decorative component 1 for a vehicle of the embodiment is a garnish attached to, for example, a front bumper portion or a rear bumper portion of a vehicle.

First Embodiment

Figure 1:
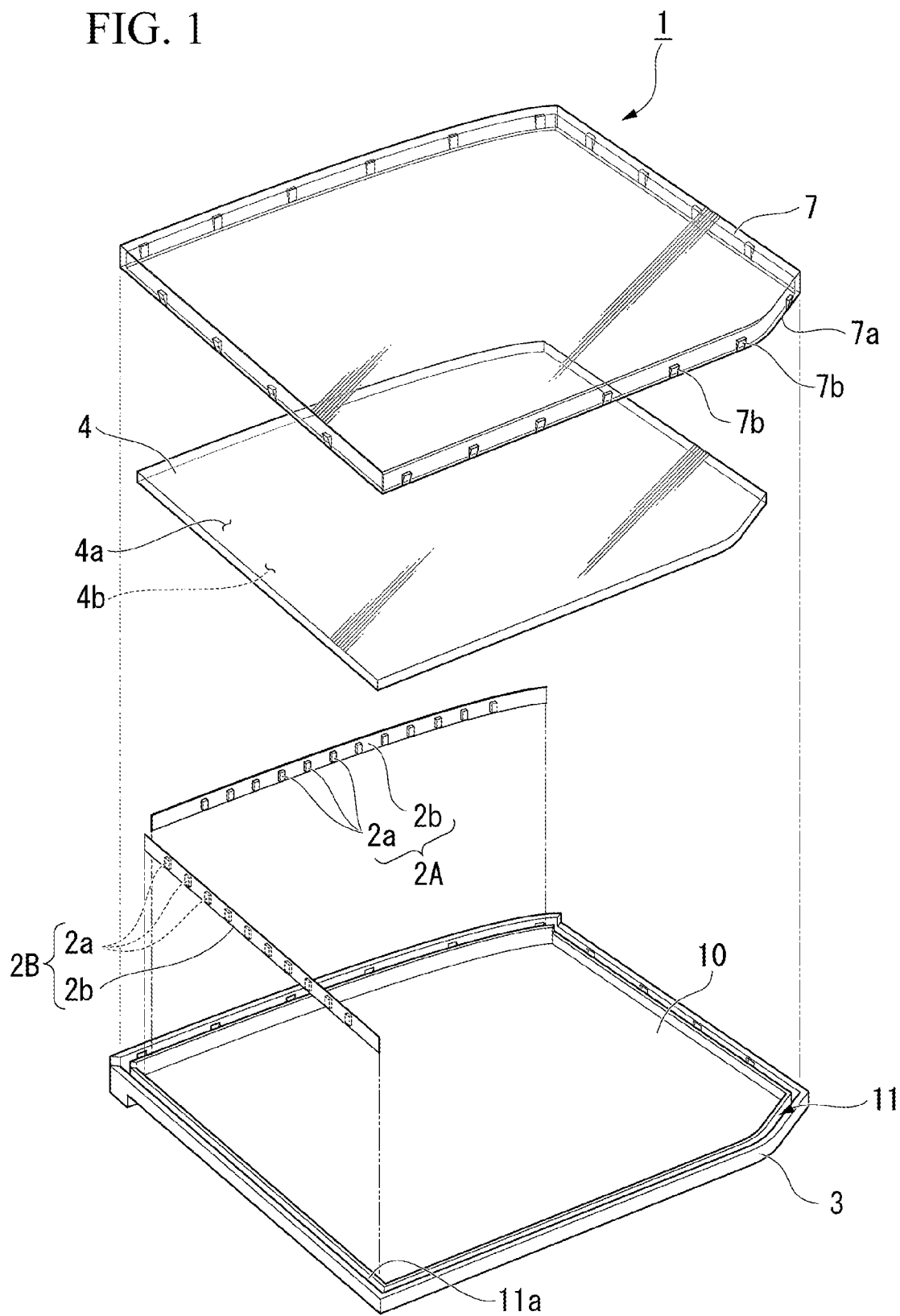
FIG. 1 is an exploded perspective view showing a schematic configuration of a decorative component for a vehicle.

FIG. 1 is an exploded perspective view showing a schematic configuration of the decorative component 1 for a vehicle.

The decorative component 1 for a vehicle of the embodiment can perform a plurality of pattern displays.

As shown in FIG. 1, the decorative component 1 for a vehicle includes two light source sections 2A and 2B, a housing 3, a light guide member 4 and an outer lens 7.

The first light source section 2A and the second light source section 2B each have a plurality of light source sections 2a and a support substrate 2b configured to support the plurality of light source sections 2a and can be separately turned ON and OFF. Each of the light source sections 2a is constituted by, for example, a chip LED configured to emit white light. In addition, a high output (high luminance) type LED for vehicle illumination is used as the chip LED.

The housing 3 is constituted by a member having a bottomed box shape and holds the two light source sections 2A and 2B. For example, a metal or a resin is used as the material that constitutes the housing 3. The housing 3 has a bottom plate section 10 and a frame-shaped section 11 provided along an outer circumferential edge of the bottom plate section 10. The light source sections 2A and 2B are disposed along two neighboring sides of the frame-shaped section 11 and held. The frame-shaped section 11 has a groove section 11a formed along an external form of the frame-shaped section 11. The groove section 11a is fitted to a part of the outer lens 7 to hold the outer lens 7 as will be described below.

The light guide member 4 takes in the light emitted from the light source sections 2A and 2B and guides the light to the inside.

The light guide member 4 is formed of a material having a higher refractive index than air, for example, a transparent resin such as polycarbonate, acryl, or the like, glass, or the like. The light guide member 4 has substantially the same size and shape as the bottom plate section 10 of the housing 3. The light guide member 4 is sandwiched and held between the housing 3 and the outer lens 7.

The light guide member 4 has an outer surface (a first surface) 4a and an inner surface (a second surface) 4b, which face each other. The inner surface 4b is a surface that faces the housing 3. The outer surface 4a is a surface (a light emitting surface) configured to emit light guided through the light guide member 4 to the outside. The light emitted from the light source sections 2A and 2B and entering the light guide member 4 is totally reflected by the outer surface 4a and the inner surface 4b and guided through the light guide member 4.

The outer lens 7 is formed of, for example, a transparent resin such as polycarbonate, acryl, or the like, glass, or the like. The outer lens 7 has the same external form as the housing 3. The outer lens 7 has a side plate section 7a provided along an outer circumferential edge portion thereof. The side plate section 7a has a plurality of claw sections 7b provided on a surface thereof. The outer lens 7 is attached to the housing 3 by fitting the plurality of claw sections 7b provided on the surface of the side plate section 7a into the groove section 11a of the housing 3 (the frame-shaped section 11). Further, an adhesive agent (not shown) may be disposed between the claw sections 7b and the groove section 11a.

The decorative component 1 for a vehicle of the embodiment accommodates the light source sections 2A and 2B and the light guide member 4 in the space constituted by the housing 3 and the outer lens 7 based on the above-mentioned configuration. Further, a configuration in which the outer lens 7 is omitted and the light source sections 2A and 2B are accommodated in the space constituted by the light guide member 4 and the housing 3 may be employed.

Figure 2:
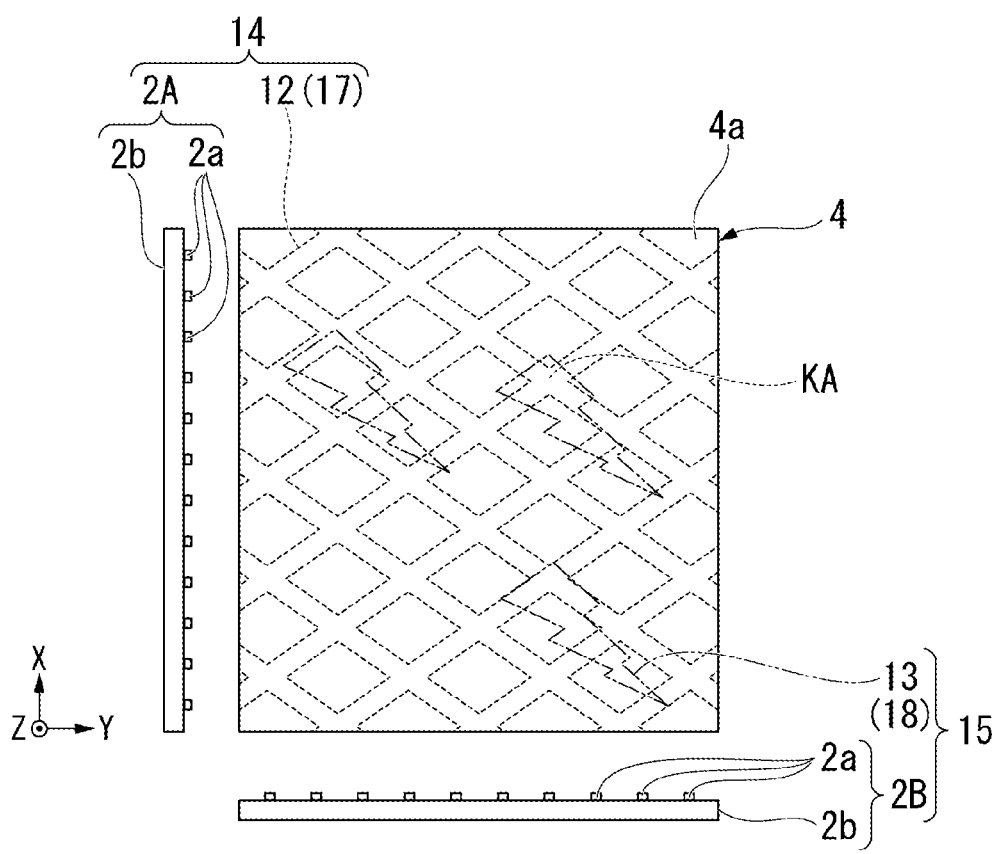
FIG. 2 is a view showing a schematic configuration of the light guide member and two light source sections, and is a plan view showing a light guide member in a light emitting direction (an outer surface side).
Figure 3A:
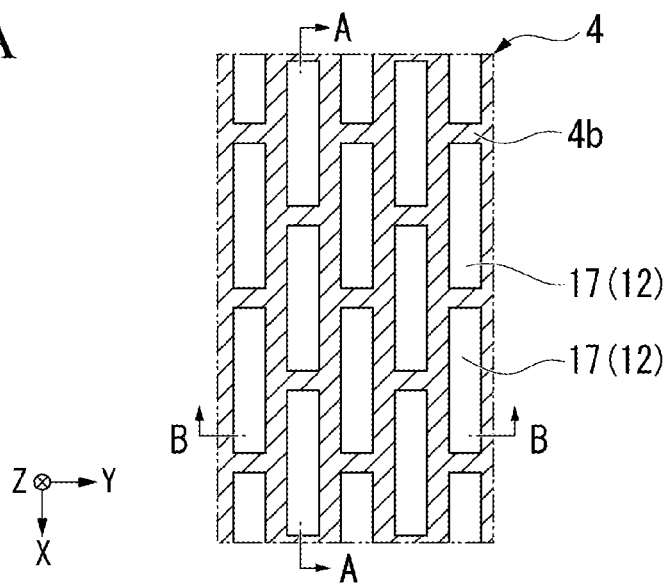
FIG. 3A is an enlarged view of a main part when the light guide member is seen from an inner surface side.
Figure 3B:
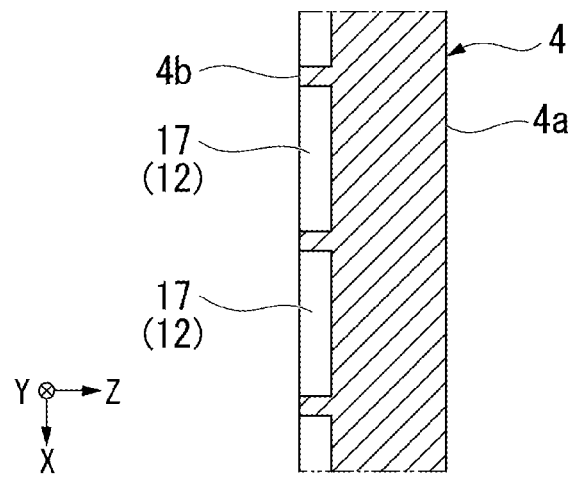
FIG. 3B is a cross-sectional view taken along line A-A in FIG. 3A.
Figure 3C:
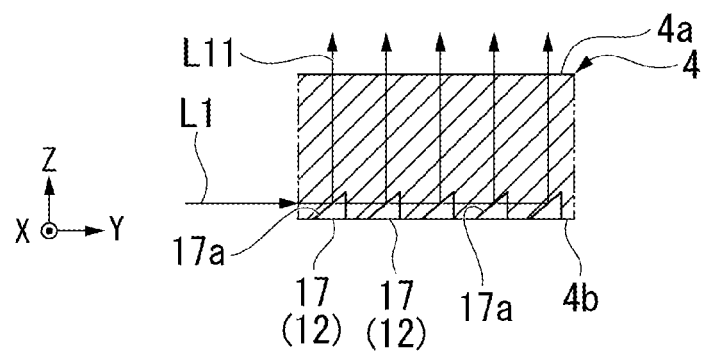
FIG. 3C is a cross-sectional view taken along line B-B in FIG. 3A.
Figure 4A:
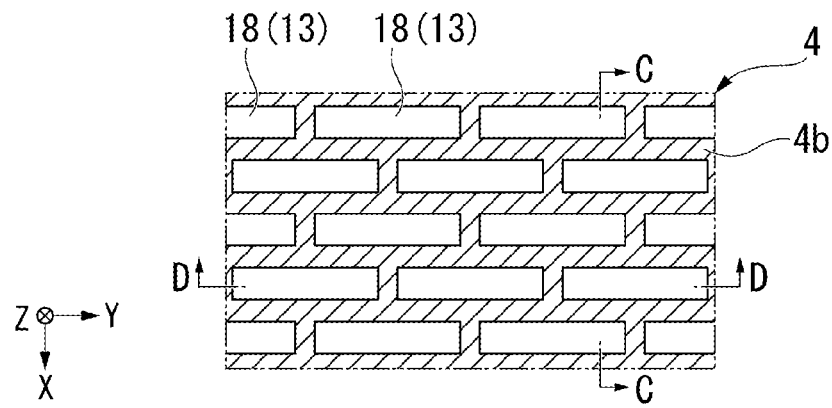
FIG. 4A is an enlarged view of a main part when the light guide member is seen from the inner surface side.
Figure 4B:
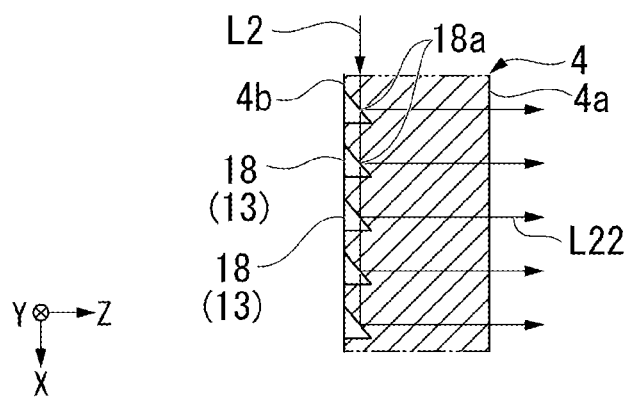
FIG. 4B is a cross-sectional view taken along line C-C in FIG. 4A.
Figure 4C:
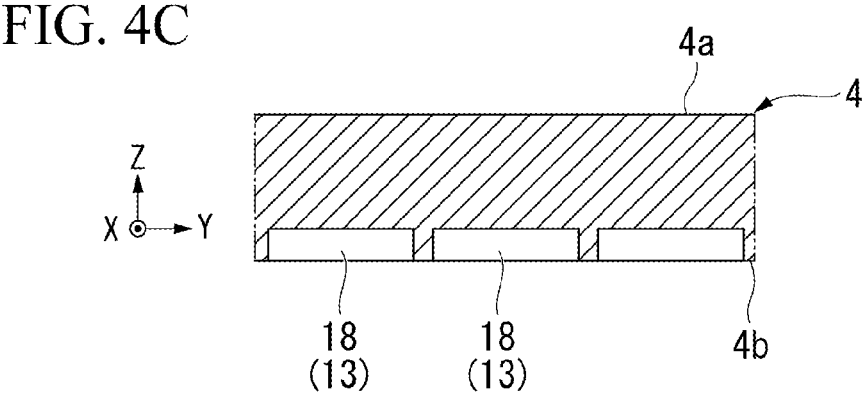
FIG. 4C is a cross-sectional view taken along line D-D in FIG. 4A.

FIG. 2 is a view showing a schematic configuration of the light guide member 4 and the two light source sections 2A and 2B, and is a plan view when the light guide member 4 is seen in the light emitting direction (the outer surface 4a side). FIG. 3A is an enlarged view of a main part when the light guide member 4 is seen front the inner surface 4b side. FIG. 3B is a cross-sectional view taken along line A-A in FIG. 3A. FIG. 3C is a cross-sectional view taken along line B-B in FIG. 3A. FIG. 4A is an enlarged view of a main part when the light guide member 4 is seen from the inner surface 4b side. FIG. 4B is a cross-sectional view taken along line C-C in FIG. 4A. FIG. 4C is a cross-sectional view taken along line D-D in FIG. 4A. Further, in FIG. 2, FIG. 3A to FIG. 3C and FIG. 4A to FIG. 4C, in order for the drawings to be easier to understand, an XYZ coordinate system is used. In the drawings, an X-axis direction is a direction along the light emitting direction from the light source section 2B, a Y-axis direction is a direction along the light emitting direction from the light source section 2A, and a Z-axis direction is a direction perpendicular to the X axis and the Y axis and along the light emitting direction of the light guide member 4.

Light emitting sections 12 and 13 equal in number to the light source sections 2A and 2B are formed on the light guide member 4 of the embodiment. Specifically, the two light emitting, sections 12 and 13 corresponding to the above mentioned two light source sections 2A and 2B are formed.

In the decorative component 1 for a vehicle of the embodiment, as shown in FIG. 2, two pattern forming sections 14 and 15 are provided in which the light source sections (2A, 2B) and the light emitting sections (12, 13) are in one-to-one correspondence, respectively. Specifically, the first pattern forming section 14 is constituted by the first light source section 2A and the first light emitting section 12, and the second pattern forming section 15 is constituted by the second light source section 2B and the second light emitting section 13.

As shown in FIG. 2, the first light emitting section 12 has a lattice-shaped pattern form constituted by a plurality of first prism cut sections (FIG. 3A: cut sections) 17 when the light guide member 4 is seen in a surface normal direction of the outer surface 4a in a plan view (hereinafter, simply referred to as "when seen in a plan view"). While the first light emitting section 12 is formed on the entire light guide member 4 in the embodiment, shapes, numbers, sizes, positions, and so on, of the first light emitting section 12 can be appropriately changed.

As shown in FIG. 3A, FIG. 3B and FIG. 3C, the first light emitting section 12 is constituted by the plurality of first prism cut sections 17 formed on the inner surface 4b of the light guide member 4. As shown in FIG. 3C, the first prism cut sections 17 have reflecting surfaces 17a configured to reflect first light L1 emitted from the first light source section 2A toward the outer surface 4a of the light guide member 4. The reflecting surfaces 17a of the first prism cut sections 17 have the same orientation to race the corresponding first light source section 2A (FIG. 2).

The first prism cut sections 17 reflect the first light L1 emitted from the first light source section 2A and guided through the light guide member 4 at the reflecting surfaces 17a, and cause the first light L1 to be emitted from the outer surface 4a as a first emission pattern light L11. In this way, the first emission pattern light L11 is constituted by a plurality of lights reflected by the reflecting surfaces 17a of the first prism cut sections 17.

Figure 5:
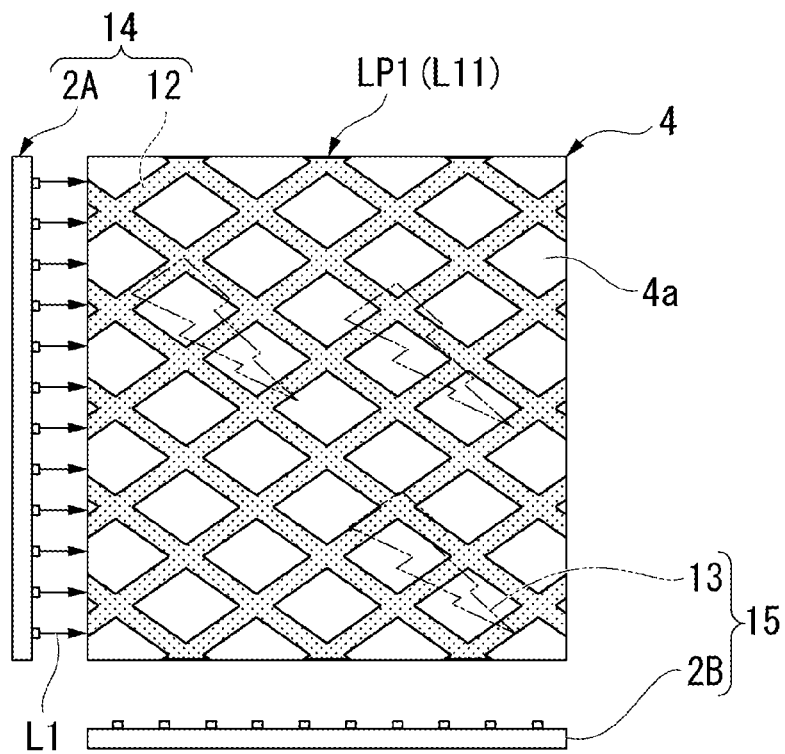
FIG. 5 is a view showing an aspect in which a first emission pattern is emitted by a first pattern forming section.

The first emission pattern light L11 shown in FIG. 3C forms a first emission pattern LP1 having a lattice shape shown in FIG. 5. The first emission pattern LP1 generated by the first emission pattern light L11 is the same as the pattern form (the pattern form having a lattice shape shown in FIG. 2) of the first light emitting section 12 constituted by the plurality of first prism cut sections 17.

As shown in FIG. 2, the second light emitting section 13 has a lightning pattern constituted by a plurality of second prism cut sections (FIG. 4A: cut sections) 18 when seen from the outer surface 4a side of the light guide member 4 in a plan view. While the three second light emitting sections 13 are formed on the light guide member 4 in the embodiment, shapes, numbers, sizes, positions, and so on, of the second light emitting sections 13 can be appropriately changed.

As shown in FIG. 4A, FIG. 4B and FIG. 4C, the second light emitting section 13 is constituted by the plurality of second prism cut sections 18. The second prism cut sections 18 are formed at positions on the inner surface 4b of the light guide member 4 different from those where the first prism cut sections 17 are formed. As shown in FIG. 4B, the second prism cut sections 18 have reflecting surfaces 18a configured to reflect second light L2 emitted from the second light source section 2B toward the outer surface 4a of the light guide member 4. The reflecting surfaces 18a of the second prism cut sections 18 have the same orientation to face the corresponding second light source section 2B (FIG. 2).

The second prism cut sections 18 reflect the second light L2 emitted from the second light source section 2B and guided through the light guide member 4 at the reflecting surfaces 18a and cause the second light L2 to be emitted from the outer surface 4a as a second emission pattern light L22. In this way, the second emission pattern light L22 is constituted by a plurality of lights reflected by the reflecting surfaces 18a of the second prism cut sections 18.

Figure 6:
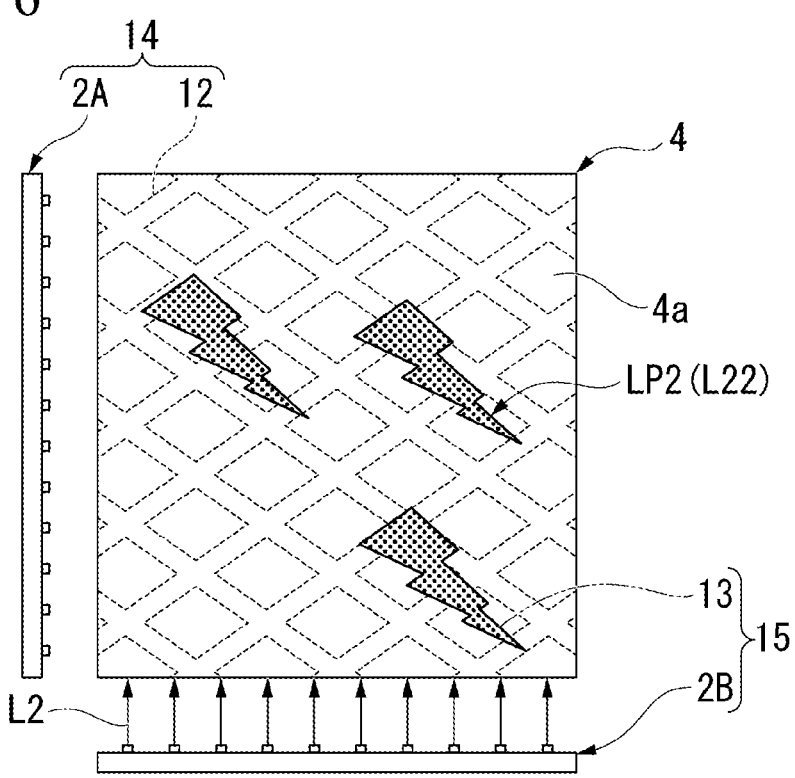
FIG. 6 is a view showing an aspect in which a second emission pattern is emitted by a second pattern forming section.

The second emission pattern light L22 shown in FIG. 4B forms a second emission pattern LP2 having a lightning shape as shown in FIG. 6. The second emission pattern LP2 generated by the second emission pattern light L22 is the same as the pattern form (a lightning pattern form shown in FIG. 2) of the second light emitting section 13 constituted by the plurality of second prism cut sections 18.

In the embodiment, the reflecting surfaces 17a and 18a of a plurality of prism cut sections 17 and 18 in the light emitting sections 12 and 13 and the corresponding light source sections 2A and 2B are facing each other in different directions for each of the pattern forming sections 14 and 15. Accordingly, in each of the pattern forming sections 14 and 15, the first light emitting section 12 and the second light emitting section 13 can selectively reflect the lights L1 and L2 emitted from the corresponding light source sections 2A and 2B, respectively.

In this way, since any one of the light emitting sections 12 and 13 can be selectively emitted because a processing direction of the reflecting surfaces 17a and 18a of the plurality of prism cut sections 17 and 18 is changed for each of the light emitting sections 12 and 13, a plurality of emission patterns LP1 and LP2 can be generated by the single light guide member 4.

In the embodiment, the first light emitting section 12 and the second light emitting section 13 partially overlap each other in the inner surface 4b of the light guide member 4. That is, the inner surface 4b of the tight guide member 4 includes a mixed region KA (FIG. 2) in which the first light emitting section 12 and the second light emitting section 13 are mixed. Both the first prism cut sections 17 and the second prism cut sections 18 are formed in the mixed region KA.

For example, even when both of the prism cut sections 17 and 18 are mixed in the same region, since directions of the reflecting surfaces 17a and 18a are different from each other in the first prism cut sections 17 and the second prism cut sections 18, only the light emitted from a specified direction can be selectively reflected by the prism cut sections 17 and 18. For this reason, in the mixed region KA, according to the light source sections 2A and 2B that are turned on, the light reflected by the first prism cut sections 17 and the light reflected by the second prism cut sections 18 are appropriately emitted.

Further, shapes of the first prism cut sections 17 and the second prism cut sections 18 are not particularly limited, and any shape may be employed as long as the lights L1 and L2 guided through the light guide member 4 by total reflection can be refracted and emitted from the outer surface 4a of the light guide member 4.

For example, as the shapes of the cut sections of the first prism cut sections 17 and the second prism cut sections 18, triangular pyramidal shapes, or polygonal pyramidal shapes with bases of four or more sides (quadrangular pyramidal shapes, hexagonal pyramidal shapes, or the like) may be employed.

When the shapes of the cut sections are triangular pyramidal shapes, three light source sections are disposed to face surfaces thereof, and light entering in three directions can be selectively reflected by the surfaces of the triangular pyramids. Also, when the shapes are quadrangular pyramidal shapes or hexagonal pyramidal shapes, four or six light source sections are disposed to face surfaces thereof, and light entering in four directions or six directions can be selectively reflected by the surfaces of the quadrangular pyramids or the hexagonal pyramids.

In addition, regarding the shapes of the cut sections of the first prism cut sections 17 and the second prism cut sections 18, pentahedrons or hexahedrons having trapezoidal cross sections may be employed. When the shapes of the cut sections are pentahedrons or hexahedrons, the light source sections are disposed to face the respective surfaces, and the light entering in five directions or six directions can be selectively reflected by each of the surfaces of the pentahedrons or the hexahedrons.

In addition, when a thickness of the light guide member 4 is, for example, 2 mm, depths of the first prism cut sections 17 and the second prism cut sections 18 are set to about 10 to 200 μm. While a depth D1 (FIG. 3B) of the first prism cut sections 17 and a depth D2 (FIG. 4C) of the second prism cut sections 18 are equal to each other in the embodiment, the depths D1 and D2 may be different from each other.

Next, an operation of the decorative component 1 for a vehicle of the embodiment will be described.

When the vehicle on which the decorative component 1 for a vehicle of the embodiment is mounted travels at nighttime, any one of the two light source sections 2A and 2B is turned on.

FIG. 5 is a view showing an aspect in which the first emission pattern LP1 is emitted by the first pattern forming section 14. When the first emission pattern LP1 is emitted, in a state in which the second light source section 2B of the second pattern forming section 15 is turned off, the first light source section 2A of the first pattern forming section 14 is tamed on. The light L1 emitted from the first light source section 2A is taken into the light guide member 4 and guided through the light guide member 4.

The light L1 guided through the light guide member 4 is reflected at each of the reflecting surfaces 17a (FIG. 3C) of the plurality of first prism cut sections 17 that constitute the first light emitting section 12 in the first pattern forming section 14 and is emitted from the outer surface 4a as the first emission pattern light L11. In this way, the first emission pattern light L11 is generated in the first light emitting section 12 by turning on the first light source section 2A, and the first emission pattern LP1 having a lattice shape shown in FIG. 5 is emitted.

FIG. 6 is a view showing an aspect in which the second emission pattern LP2 is emitted by the second pattern forming section 15. When the second emission pattern LP2 is emitted, in a state in which the first light source section 2A of the second pattern forming section 15 is turned off, the second light source section 2B of the second pattern forming section 15 is tamed on. The light L2 emitted from the second light source section 2B is taken into the light guide member 4 and guided through the light guide member 4.

The light L2 guided through the light guide member 4 is reflected at each of the reflecting surfaces 18a (FIG. 4B) of the plurality of second prism cut sections 18 that constitute the second light emitting section 13 in the second pattern forming section 15 and emitted from the outer surface 4a as the second emission pattern light L22. In this way, the second emission pattern light L22 is generated in the second light emitting section 13 by turning on the second light source section 2B, and the second emission pattern LP2 having a lightning shape shown in FIG. 6 is emitted.

According to the configuration of the embodiment, by switching the light source sections 2A and 2B that are turned on, the plurality of emission patterns LP1 and LP2 can be emitted by the single light guide member 4. As described above, among the two pattern forming sections 14 and 15 provided on the light guide member 4, by selecting the light source section 2A (2B) corresponding to the emission pattern LP1 (LP2) that is desired to be emitted, only the light emitting section 12 (13) corresponding to the light source section 2A (2B) that is turned on is emitted, and the light emitting section 13 (12) corresponding to the light source section 2B (2A) that is not turned on is not emitted. For this reason, it is possible to make the specified light emitting sections 12 and 13 emit light by simply changing a light entrance direction with respect to the light guide member 4 by the switching of the light source sections 2A and 2B to be turned on, and the desired emission patterns LP1 and LP2 can be generated.

In this way, by providing the pattern forming sections 14 and 15 for each of the emission patterns LP1 and LP2 and changing the light entrance direction of the light entering the light guide member 4 by selecting the light source sections 2A and 2B that emit light, it is possible to the plurality of emission patterns LP1 and LP2 can be individually emitted while using the single light guide member 4. Accordingly, it is possible to generate an emission pattern having a good appearance by generating various emission pattern lights using a single light guide member 4.

While the two pattern forming sections 14 and 15 are provided in the decorative component 1 for a vehicle of the embodiment, the number of pattern forming sections 14 and 15 is not limited two. Three or more pattern forming sections may be provided, or a plurality of emission patterns may be emitted (displayed) using a single light guide member 4.

Second Embodiment

Next, a decorative component 20 for a vehicle of a second embodiment according to the present invention will be described.

While a basic configuration of the embodiment is the same as that of the first embodiment, the second embodiment is distinguished from the first embodiment in that a plurality of (three or more) pattern forming sections are provided. In the following description, places different from the first embodiment will be described in detail and description of common places will be omitted. In addition, in the drawings used in the description, common components in FIG. 1 to FIG. 6 are designated by the same reference numerals.

Figure 7:
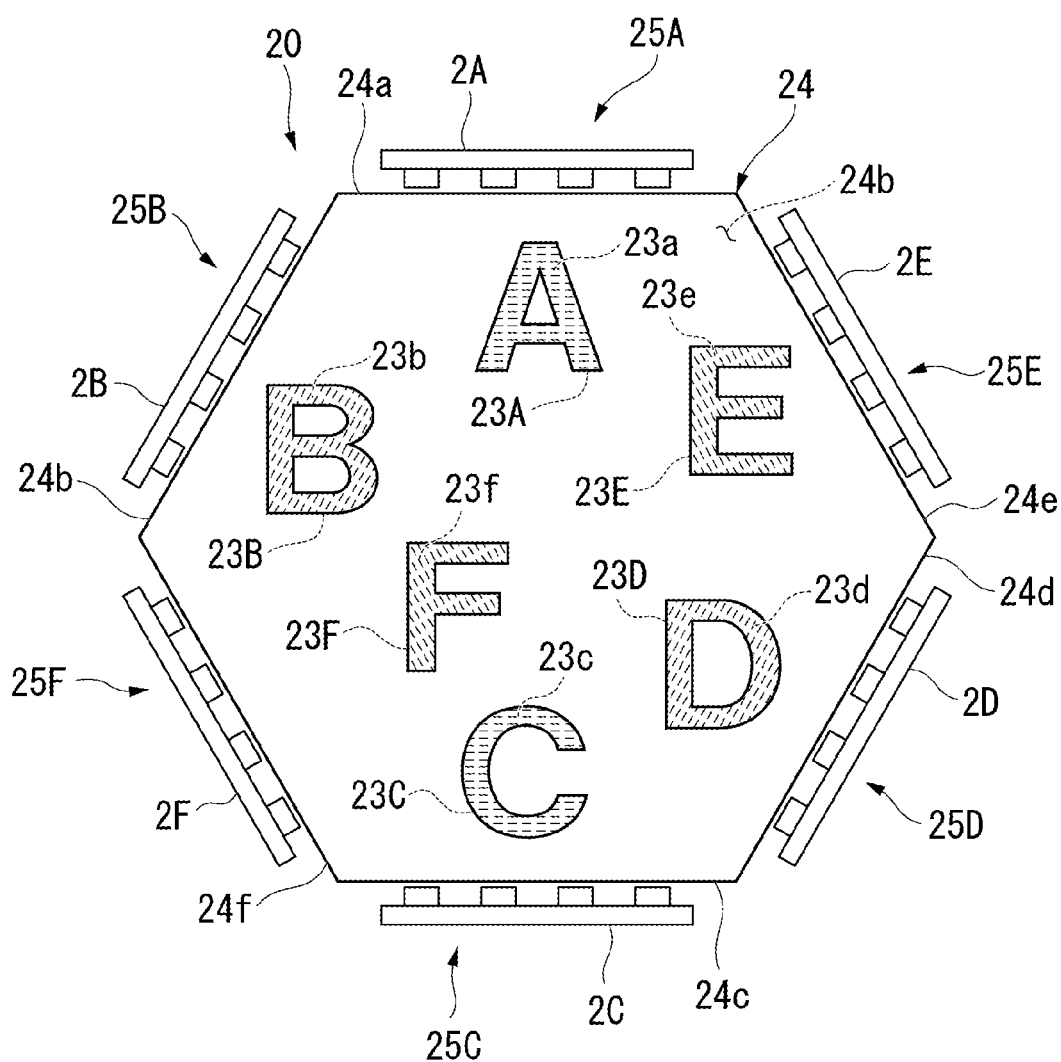
FIG. 7 is a plan view showing a main configuration of a decorative component for a vehicle of a second embodiment.

FIG. 7 is a plan view showing a main configuration of the decorative component 20 for a vehicle of the second embodiment.

As shown in FIG. 7, the decorative component 20 for a vehicle of the embodiment includes a light guide member 24 having a hexagonal shape when seen in a plan view, six light source sections 2A to 2F, the above-mentioned housing (not shown), and an outer lens (not shown), and can display a plurality of characters.

The light source sections 2A to 2F are provided to face six sides 24a to 24f of the light guide member 24, respectively. Here, the light source sections 2A to 2F are provided with respect to the sides 24a to 24f, respectively. A configuration of each of the light source sections 2A to 2F is the same as that of the first embodiment.

Light emitting sections 23A to 23F are formed on the inner surface 24b of the light guide member 24 to the same number as that of the light source sections 2A to 2F. Specifically, the six light emitting sections 23A to 23F are formed to correspond to the six light source sections 2A to 2F. The light emitting sections 23A to 23F each have a predetermined pattern form constituted by a plurality of prism cut sections 23a to 23f. Pattern forms of the light emitting sections 23A to 23F are different from each other, and, for example, in the embodiment, as shown in FIG. 7, are pattern forms referred to as "A," "B," "C," "D," "E" and "F."

Further, in the embodiment, the pattern forms are not limited to alphabet pattern forms and the pattern forms in the light emitting sections 23A to 23F may be appropriately changed to another language, symbols, figures, or the like.

As shown in FIG. 7, six pattern forming sections 25A to 25F axe provided in which the light source sections 2A to 2F and the light emitting sections 23A to 23F are in one-to-one correspondence, respectively. Specifically, the first pattern forming section 25A is constituted by the first light source section 2A and the second light emitting section 23A. The second pattern forming section 25B is constituted by the second light source section 2B and the second light emitting section 23B. The third pattern forming section 25C is constituted by the third light source section 2C and the third light emitting section 23C. The fourth pattern forming section 25D is constituted by the fourth light source section 2D and the fourth light emitting section 23D. The fifth pattern forming section 25E is constituted by the fifth light source section 2E and the fifth light emitting section 23E. The sixth pattern forming section 25F is constituted by the sixth light source section 2F and the sixth light emitting section 23F.

Each of the reflecting surfaces (not shown) of the plurality of prism cut sections 23a to 23f in the light emitting sections 23A to 23F have orientations to face the corresponding light source sections 2A to 2F, and directions in which each of the reflecting surface of the plurality of prism cut sections 23a to 23f and the corresponding light source sections 2A to 2F face each other are different from each other for each of the pattern forming sections 25A to 25F. Accordingly, in each of the light emitting sections 23A to 23F, only light from the corresponding light source sections 2A to 2F facing each other is selectively reflected.

In the embodiment, by turning on the light source section 2A in the pattern forming section 25A, the light from the light source section 2A is reflected at the prism cut sections 23a of the light emitting section 23A, and "A" is displayed on the light guide member 24. By turning on the light source section 2B in the pattern forming section 25B, the light from the light source section 2B is reflected at the prism cut sections 23b of the light emitting section 23B, and "B" is displayed on the light guide member 24. By turning on the light source section 2C in the pattern forming section 25C, the light from the light source section 2C is reflected at the prism cut sections 23c of the light emitting section 23C, and "C" is displayed on the light guide member 24. By turning on the light source section 2D in the pattern forming section 25D, the light from the light source section 2D is reflected at the prism cut sections 23d of the light emitting section 23D, and "D" is displayed on the light guide member 24. By turning on the light source section 2E in the pattern forming section 25E, the light from the light source section 2E is reflected at the prism cut sections 23e of the light emitting section 23E, and "E" is displayed on the light guide member 24. By turning on the light source section 2F in the pattern forming section 25F, the light from the light source section 2F is reflected at the prism cut sections 23f of the light emitting section 23F, and "F" is displayed on the light guide member 24.

In this way, in the embodiment, in a state when the light guide member 24 is seen in a plan view, the forms of the emission pattern lights emitted from the light emitting sections 23A to 23F of the pattern forming sections 25A to 25F are different from each other, and by turning on the arbitrary light source sections 2A to 2F of the pattern forming sections 25A to 25F, the light emitted from the light source sections 2A to 2F are reflected at the corresponding light emitting sections 23A to 23F, and emission patterns corresponding to the pattern forms of the light emitting sections 23A to 23F can be generated.

In the embodiment, the light source sections 2A to 2F may be turned on in sequence or may be turned on randomly, or some of the plurality of light source sections 2A to 2F may be turned on simultaneously.

In addition, a colorful display becomes possible by changing emission colors for each of the light source sections 2A to 2F.

Third Embodiment

Next, a decorative component 30 for a vehicle of a third embodiment according to the present invention will be described.

While a basic configuration of the embodiment is substantially the same as that of the second embodiment, pattern forms of light emitting sections 33A to 33F are different.

Figure 8:
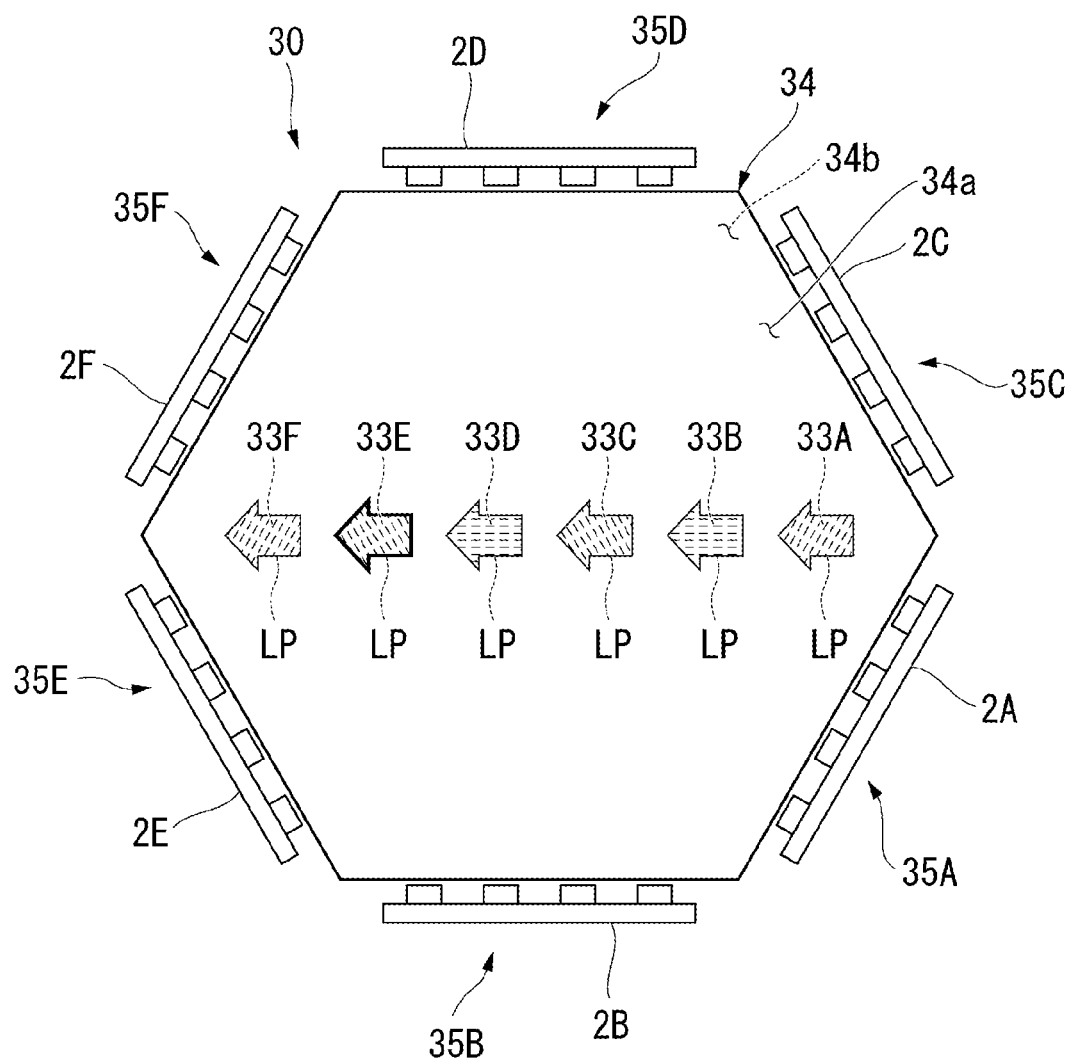
FIG. 8 is a plan view showing a main configuration of a decorative component for a vehicle of a third embodiment.

FIG. 8 is a plan view showing a main configuration of the decorative component 30 for a vehicle of the third embodiment.

As shown in FIG. 8, the decorative component 30 for a vehicle of the embodiment has six pattern forming sections 35A to 35F. The six light emitting sections 33A to 33F having the same pattern form are formed on an inner surface 34b of a light guide member 34 having a hexagonal shape when seen in a plan view. For example, the light emitting sections 33A to 33F of the embodiment has pattern forms that express "arrows" when the light guide member 34 is seen in a plan view, and the pattern forms are formed to be arranged in a row and all of them are shown to indicate the same direction.

In the embodiment, by sequentially turning on or off each of the light source sections 2A to 2F corresponding to the light emitting sections 33A to 33F arranaed in a row, each of the emission patterns LP showing arrows in the light emitting sections 33A to 33F are emitted in sequence, and the arrows looks like moving in one direction when seen from an outer surface 34a side of the light guide member 34.

In this way, a motion can be added to the display as a whole by disposing the plurality of light emitting sections 33A to 33F having the same pattern at positions different front each other on a single light guide member 34 and sequentially turning on the light source sections 2A to 2F. The emission patterns LP are not limited to the arrows and animation may also be displayed using another shape.

In the decorative component for a vehicle of the above-mentioned first to third embodiments, various patterns may be considered as the pattern configured to emit (display) light using the light guide member.

For example, characters as the emission patterns can be used as communication tools with respect to an oncoming vehicle or a pedestrian when stopping the vehicle by displaying the characters using the light guide member. For example, it is possible to inform surroundings of that people are getting on and off by displaying "loading and unloading" on the light guide member.

In addition, when a pedestrian is crossing a road, the vehicle can recognize the pedestrian and can inform surroundings of the reason for stopping by displaying, for example, "pedestrian crossing" on the decorative component for a vehicle (the light guide member) provided on both or any one of a front side and a rear side of the vehicle.

In addition, when the vehicle is lined up on the street to enter a parking lot, it is possible to inform surroundings of that the vehicle is lined up for parking standby by displaying, for example, "parking standby" on the light guide member.

In this way, it is possible to give attention to a following vehicle, a bicycle, or the like, by displaying characters that inform the following vehicle, the bicycle, or the like, of the above-mentioned circumstances of the vehicle on the decorative component for a vehicle (the light guide member). Contents of the characters to be displayed can be appropriately set and used instead of turning on the hazard lamp or flashing the headlight.

In addition, a configuration in which both of the decorative component for a vehicle and the communication tool are compatible in conjunction with a connected car, an advanced driver assistance system (ADAS), or the like, may be provided.

For example, when the vehicle is stolen, the vehicle can inform surroundings of that the vehicle is stolen by displaying "stolen car" on the light guide member in conjunction with a GPS or a network.

In addition, when an ambulance car should be called or a rescue is required in the vehicle, it is possible to visually inform surrounding pedestrians, oncoming vehicles or following vehicles of that a rescue is required by displaying characters such as "HELP" or the like on the light guide member in conjunction with a GPS or a network.

Fourth Embodiment

Next, a decorative component 40 for a vehicle of a fourth embodiment according to the present invention will be described.

While the configuration in which a plurality of pattern forming sections are independently displayed has been described in the above-mentioned second and third embodiments, a configuration in which one display is performed by seven pattern forming sections 45A to 45G is provided in the embodiment. In the following description, different places from the above-mentioned embodiments will be described in detail, and description of common places will be omitted.

Figure 9:
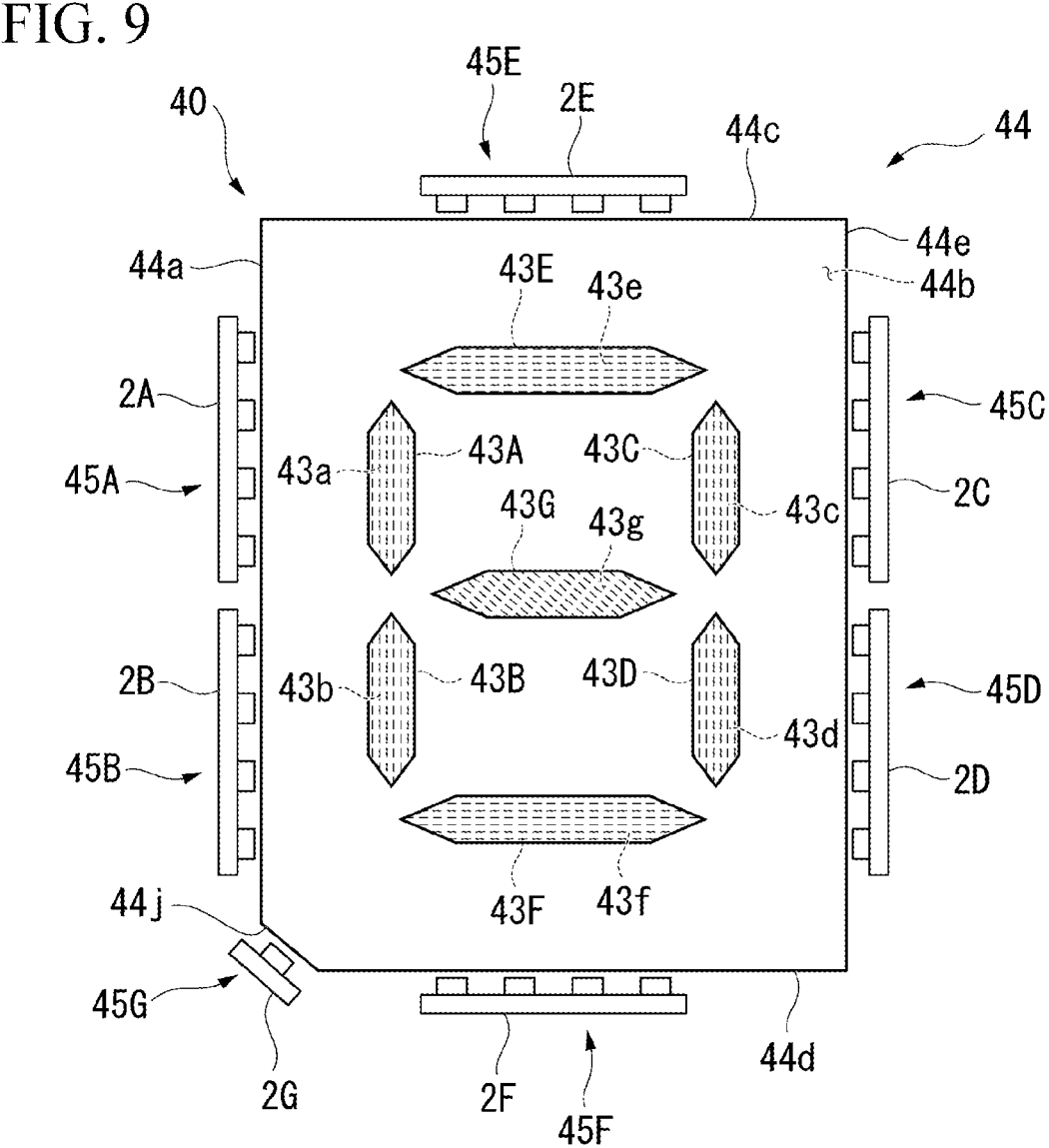
FIG. 9 is a plan view showing a main configuration of a decorative component for a vehicle of a fourth embodiment.

FIG. 9 is a plan view showing a main configuration of the decorative component for a vehicle of the fourth embodiment.

As shown in FIG. 9, the decorative component 40 for a vehicle of the embodiment includes a light guide member 44 having a rectangular shape when seen in a plan view, seven light source sections 2A to 2G, the above-mentioned housing (not shown), and the outer lens (not shown), and can display Arabian decimal figures constituted by seven segments (the pattern thrilling sections 45A to 45G).

The light source sections 2A to 2G are provided to face four sides 44a to 44d of the light guide member 44. The two light source sections 2A and 2B are provided on one long side 44a of the light guide member 44, and the two light source sections 2C and 2D are provided on the other long side 44e. In addition, the one light source section 2E is provided on one short side 44c of the light guide member 44, and the one light source section 2F is provided on the other short side 44d. In addition, the one light source section 2G is provided on a corner (for example, a corner section 44j) of the light guide member 44. Further, disposition of the light source sections 2A to 2G with respect to the light guide member 44 can be appropriately changed.

Seven light emitting sections 43A to 43G that constitute Arabian figures when seen in a plan view of the light guide member 44 are formed on an inner surface 44b of the light guide member 44. The light emitting sections 43A to 43G each have a predetermined pattern form constituted by a plurality of prism cut sections (not shown). In the embodiment, when the light guide member 44 is seen in a plan view, pattern forms of the light emitting sections 43A to 43G are substantially the same as each other. For this reason, the entire emission pattern lights emitted from the light emitting sections 43A to 43G of the pattern forming sections 45A to 45G have the same shape as a whole, and have shapes that express parts of numbers.

As shown in FIG. 9, in the embodiment, the seven pattern forming sections 45A to 45G are provided in which the light source sections 2A to 2G and the light emitting sections 33A to 33G are in one-to-one correspondence, respectively.

Specifically, the first pattern forming section 45A is constituted by the first light source section 2A and the first light emitting section 43A. The second pattern forming section 45B is constituted by the second light source section 2B and the second light emitting section 43B. The third pattern forming section 45C is constituted by the third light source section 2C and the third light emitting section 43C. The fourth pattern forming section 45D is constituted by the fourth light source section 2D and the fourth light emitting section 43D. The fifth pattern forming section 45E is constituted by the fifth light source section 2E and the fifth light emitting section 43E. The sixth pattern forming section 45F is constituted by the sixth light source section 2F and the sixth, light emitting section 43F. The seventh pattern forming section 45G is constituted by the seventh light source section 2G and the seventh light emitting section 43G.

Each of the reflecting surfaces (not shown) of a plurality of prism cut sections 43a to 43g in the light emitting sections 43A to 43G have orientations to face the corresponding light source sections 2A to 2G, and directions in which each of the reflecting surfaces of the plurality of prism cut sections 43a to 43g and the corresponding light source sections 2A to 2F face each other are different from each other for each of the pattern forming sections 45A to 45G. Accordingly, in each of the light emitting sections 43A to 43G, only light from the corresponding light source sections 2A to 2G facing each other is selectively reflected.

In the embodiment, an arbitrary number can be displayed on the light guide member 44 by appropriately changing combinations of the light source sections 2A to 2G that are to be turned on, according to a desired numeral to be displayed among the light source sections 2A to 2G in the seven pattern forming sections 45A to 45G. For example, by turning on the light source sections 2C and 2D, light is reflected at the prism cut sections 43c and 43d of the light emitting sections 43C and 43D, and a numeral "1" is displayed. In addition, by turning on all of the light source sections 2A to 2G, light is reflected at the prism cut sections 43a to 43g of the light emitting sections 43A to 43G, and a numeral "8" is displayed.

In this way, in the embodiment, since a configuration in which one display is performed by all of the pattern forming sections 45A to 45G is provided, a desired numeral to be displayed can be changed by changing combinations of the light source sections 2A to 2G that are to be turned on.

Further, in the embodiment, while all of the emission pattern lights emitted from the light emitting sections 43A to 43G of all of the pattern forming sections 45A to 45G have the same shape, all of the emission pattern lights may not have the same shape. For example, forms of other emission pattern lights may be different from each other as long as at least two of the emission pattern lights emitted from the light emitting sections 43A to 43G have the same shape.

Fifth Embodiment

Next, a decorative component 50 for a vehicle of a fifth embodiment according to the present invention will be described.

Figure 10:
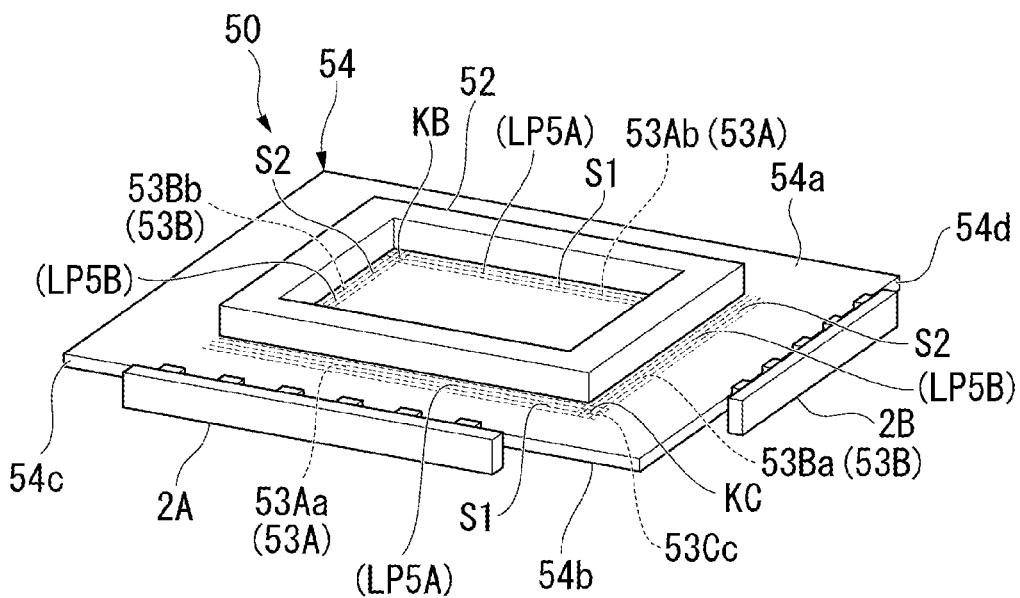
FIG. 10 is a perspective view showing a main configuration of a decorative component for a vehicle of a fifth embodiment.
Figure 11:
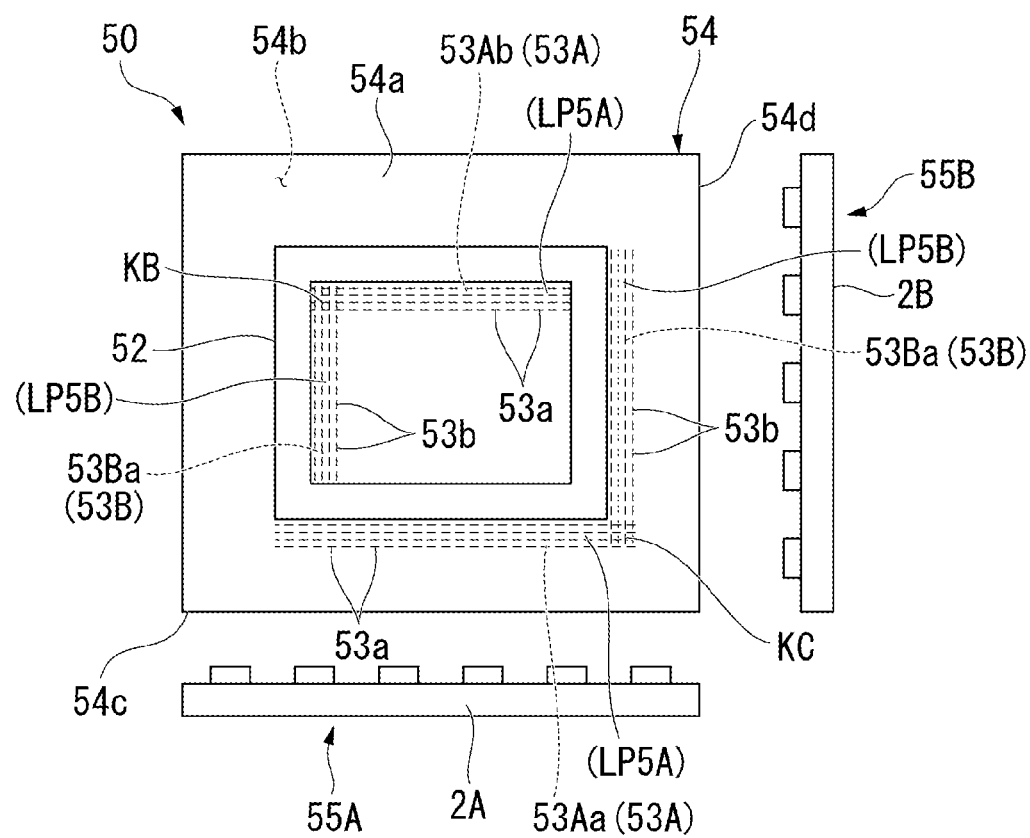
FIG. 11 is a plan view showing the main configuration of the decorative component for a vehicle of the fifth embodiment.

FIG. 10 is a perspective view of a main configuration of the decorative component 50 for a vehicle of the fifth embodiment. FIG. 11 is a plan view showing a main configuration of the decorative component 50 for a vehicle of the fifth embodiment.

As shown in FIG. 10 and FIG. 11, the decorative component 50 for a vehicle of the embodiment includes a light guide member 54, two light source sections 2A and 2B, and a formed object 52 having a frame shape.

The light source sections 2A and 2B are provided on neighboring two sides 54c and 54d of the light guide member 54, respectively.

The formed object 52 is disposed on an emission side of the light guide member 54, for example, on an outer surface 54a of the light guide member 54. Further, the formed object 52 may be disposed on the outer lens 7 shown in FIG. 1.

In a state where the light guide member 54 is seen in a plan view, first light emitting sections 53Aa and 53Ab and second light emitting sections 53Ba and 53Bb are formed on an inner surface 54b of the belt guide member 54 at positions adjacent to the formed object 52. Hereinafter, when the first light emitting sections 53Aa and 53Ab and the second light emitting sections 53Ba and 53Bb are not discriminated, they may be simply referred to as "light emitting sections 53A and 53B."

The first light emitting section 53Aa and the second light emitting section 53Ba are formed to be disposed outside a frame of the formed object 52. Meanwhile, the first light emitting section 53Ab and the second light emitting section 53Bb are formed to be disposed inside the frame of the formed object 52.

In the embodiment, as shown in FIG. 11, a first pattern forming section 55A is constituted by the first light emitting sections 53Aa and 53Ab, and the first light source section 2A corresponding thereto. In addition, a second pattern forming section 55B is constituted by the second light emitting sections 53Ba and 53Bb, and the second light source section 2B corresponding thereto.

The light emitting sections 53A and 53B have predetermined pattern forms constituted by plurality of prism cut sections 53a and 53b, respectively. In the embodiment, the first light emitting sections 53Aa and 53Ab and the second light emitting sections 53Ba and 53Bb have slender pattern forms adjacent to sides corresponding to four sides of the formed object 52.

In the embodiment, the first light emitting section 53A and the second light emitting section 53B partially overlap each other on the inner surface 54b of the light guide member 54. That is, the inner surface 54b of the light guide member 54 includes a first region KB and a second region KC in which the first light emitting section 53A and the second light emitting section 53B are mixed, at inside and outside the frame of the formed object. Both of the plural prism cut sections 53a of the first light emitting section 53A and the plural prism cut sections 53b of the second light emitting section 53B are present in the first region KB and the second region KC.

Even in the embodiment, reflecting surfaces (not shown) of the plurality of prism cut sections 53a and 53b that constitute the light emitting sections 53A and 53B have orientations to face the corresponding light source sections 2A and 2B. For this reason, for example, even when the plurality of prism cut sections 53a and 53b that constitute both of the light emitting sections 53A and 53B are formed in the same region (the first region KB, the second region KC), since the directions of the reflecting surfaces are different from each other in the prism cut sections 53a of the light emitting section 53A and the prism cut sections 53b of the light emitting section 53B, only the light emitted from the specified direction can be selectively reflected by the prism cut sections 53a and 53b.

According to the above-mentioned configuration, when the first light source section 2A is turned on, the light emitted from the first light source section 2A is emitted from the light emitting section 53Aa and 53Ab of the light emitting section 53A as the emission pattern light, and the emission patterns LPSA (hereinafter, simply referred to as "a shadow") that give a shadow-like impression is generated on one side of the formed object 52.

In addition, when the second light source section 2B is turned on, the light emitted from the second light source section 2B is emitted from the light emitting section 53Ba and 53Bb of the right emitting section 53B as the emission pattern light, and the emission patterns LP5B (hereinafter, simply referred to as "a shadow") that give a shadow-like impression is generated on the other side of the formed object 52.

In this way, when the light source sections 2A and 2B that are to be turned on are switched, a direction in which the shadow of the formed object 52 is generated can be changed.

When the first light source section 2A and the second light source section 2B are simultaneously turned on, emission pattern lights are simultaneously emitted from both of the light emitting sections 53A and 53B. Here, in the first region KB and the second region KC, both of the emission pattern light from the light emitting section 53A and the emission pattern light of the light emitting section 53B are emitted. For this reason, luminance of the pattern light emitted from the first region KB and the second region KC is higher than that of the emission pattern emitted from the other emission region in the light emitting sections 53A and 53B, and an emission pattern having good appearance in which the luminance of the emission pattern light is partially increased can be generated around the formed object 52. This may be a kind of design.

Further, in the embodiment, while the configuration in which the prism cut sections 53a and 53b of both of the light emitting sections 53A and 53B are mixed in the first region KB and the second region KC has been described, a configuration in which the prism cut sections 53a and 53b are not formed in any one of the first region KB and the second region KC may be applied according to a design of a required emission pattern, or a configuration in which a prism cut section is formed in only one of the first region KB and the second region KC may be applied.

While the configuration in which reproduction of a shadow from two directions becomes possible by providing the two light source sections 2A and 2B (pattern forming sections 55A and 55B) has been described in the embodiment, there is no limitation thereto and a configuration that can reproduce a shadow in three directions may be applied.

(Variant)

Figure 12:
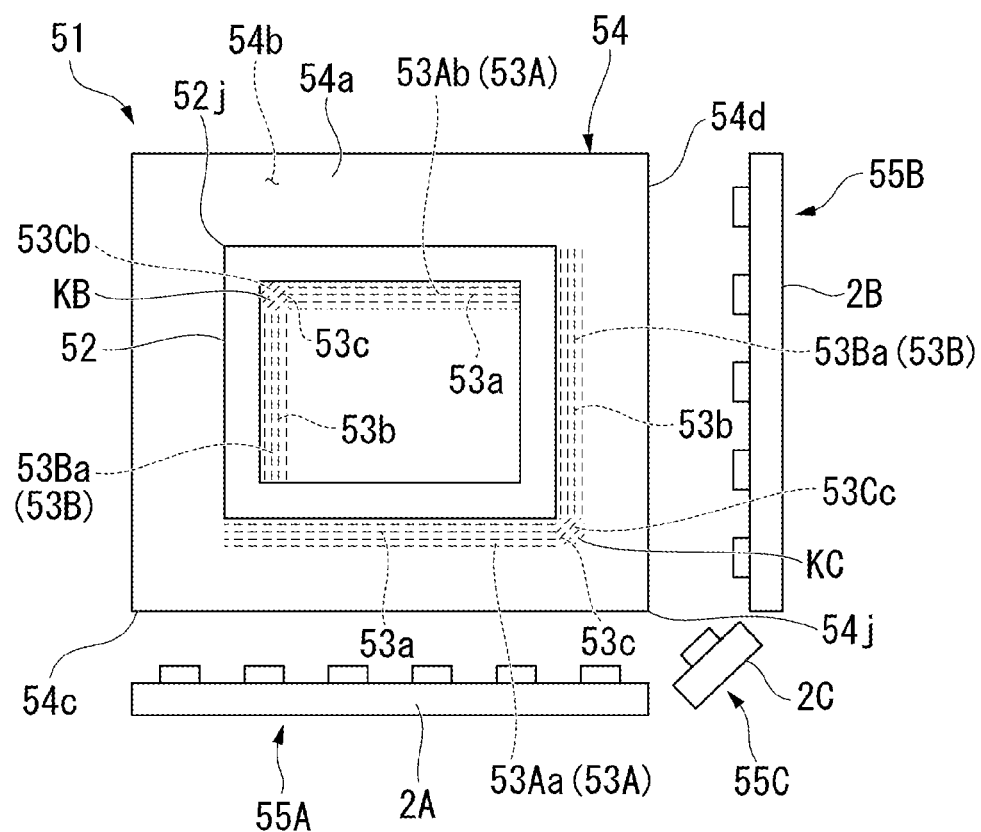
FIG. 12 is a plan view showing a configuration of a variant of the decorative component for a vehicle of the fifth embodiment.

Next, as a variant of the fifth embodiment, a configuration in which a shadow in three directions with respect to a timed object can be reproduced will be described. FIG. 12 is a plan view showing a configuration of a decorative component 51 for a vehicle according to the variant of the fifth embodiment.

Like the decorative component 51 for a vehicle shown in FIG. 12, the third light source section 2C may be further provided at a position facing a corner section 54j of the light guide member 54.

In the inner surface 54b of the light guide member 54, a third light emitting section 53Cb is formed in the first region KB inside the frame of the formed object 52 when seen in a plan view, and a third light emitting section 53Cc is formed in the second region KC outside the frame of the formed object 52. A third pattern forming section 55C is constituted by the third light emitting sections 53Cb and 53Cc and the third light source section 2C corresponding thereto.

Each of the reflecting surfaces of a plurality of prism cut sections (cut sections) 53c that constitute the third light emitting sections 53Cb and 53Cc have orientations to face the third light source section 2C. For this reason, the light emitted from the third light source section 2C can be selectively reflected by the plurality of prism cut sections 53c.

To the above-mentioned configuration, when all of the three light source sections 2A to 2C are simultaneously turned on, an aspect of a shadow when light is illuminated on the light guide member 54 from diagonally above a corner section 52j side of the formed object 52 shown in FIG. 12 toward the formed object 52 can be more naturally reproduced by the emission pattern lights emitted from the light emitting section 53A to 53C.

In the example, since there is no region in which the light emitting sections 53A, 53B and 53C overlap each other on the inner surface 54b of the light guide member 54, even when the light source sections 2A to 2C are simultaneously turned on, luminance values of the emission pattern lights emitted from the light emitting sections 53A, 53B and 53C are substantially equal to each other. Accordingly, an emission pattern that has even more better appearance is provided.

Further, in the above-mentioned configuration, while only the prism cut sections 53c that constitute a third light emitting section 53C are formed in the first region KB and the second region KC of the light guide member 54, there is no limitation thereto and, for example, three types of the prism cut sections 53a, 53b and 53c of the light emitting sections 53A, 53B and 53C may be formed in the first region KB and the second region KC.

Alternatively, light emitting sections in which orientation of the reflecting surfaces of the prism cut sections are different from each other may be provided in each of the first region KB and the second region KC. In this case, a light source section corresponding to the light emitting section of the first region KB and a light source section corresponding to the light emitting section of the second region KC may be respectively provided, and the light source sections may be individually driven.

Figure 13:
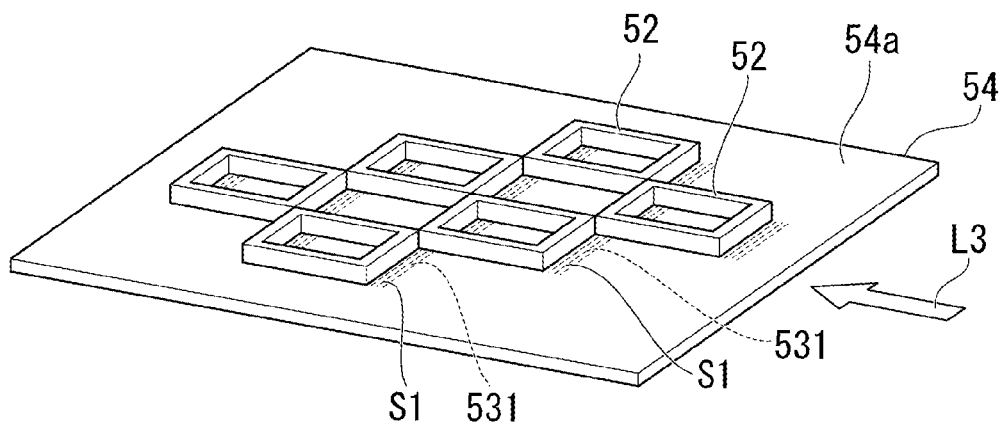
FIG. 13 is a schematic view showing a configuration of another variation of the decorative component for a vehicle of the fifth embodiment, and is a view in which an emission pattern corresponding to a first shadow is formed around a formed object.
Figure 14:
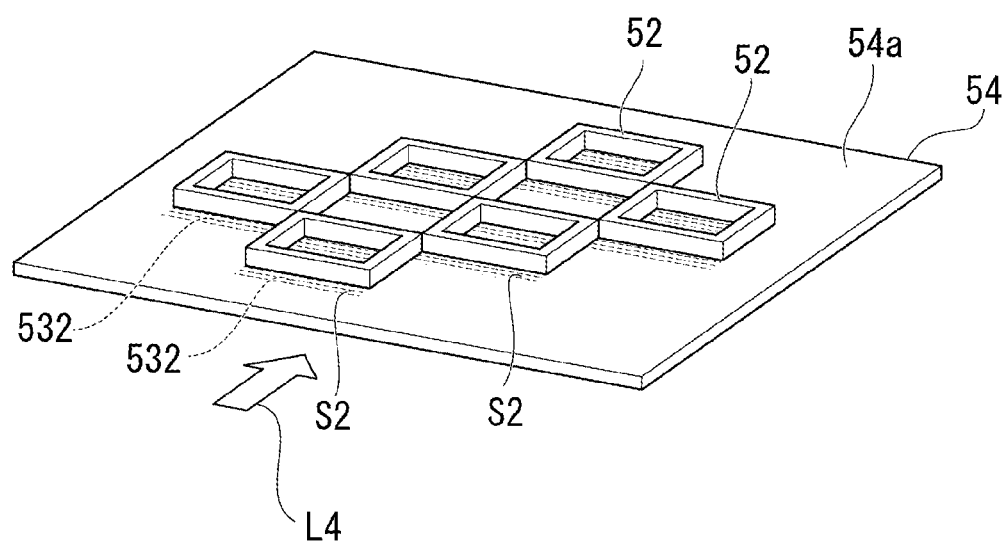
FIG. 14 is a schematic view showing a configuration of another variation of the decorative component for a vehicle of the fifth embodiment, and is a view in which an emission pattern corresponding to a second shadow is formed around a formed object.

FIG. 13 and FIG. 14 are schematic views showing a configuration of another variation of the decorative component 50 for a vehicle of the fifth embodiment. FIG. 13 is a view in which an emission pattern corresponding to a first shadow S1 is formed around the formed object 52. FIG. 14 is a view in which an emission pattern corresponding to a second shadow S2 is formed around the formed object 52.

As shown in FIG. 13 and FIG. 14, a plurality of formed objects 52 are disposed next to each other on the outer surface 54a of the light guide member 54, a plurality of light emitting sections 531 are provided adjacent to each other at positions along sides of the formed objects 52 in one direction, and a plurality of light emitting sections 532 are provided adjacent each other at positions along sides of the formed objects 52 in another direction. The light emitting sections 531 and 532 have corresponding light source sections that are different from each other. According to the configuration, when the light source sections that are to be turned on are switched, positions of the shadows S1 and S2 generated around the formed objects 52 as shown in FIG. 13 and FIG. 14 can be changed.

Further, shapes of the formed objects 52 are not limited to a frame shape shown, and another shape may be possible. In addition, numbers or disposition of the formed objects 52 and sizes of the formed objects 52 can also be appropriately changed.

As described above, according to the embodiments of the present invention, it is possible to generate an emission pattern that has good appearance by generating various patterns using a single light guide member.

Further, the technical scope of the present invention is not limited to the embodiments, and various modifications may be added without departing from the scope of the present invention.

For example, specific configurations of the plurality of embodiments may be appropriately combined.

In the above-mentioned embodiments, the number of the light emitting section corresponding to the light source sections is not limited to one, and a configuration in which a plurality of light emitting sections correspond to one light source section may be possible. In addition, a configuration in which a plurality of light source sections correspond to one light emitting section may also be possible. For example, when two light source sections that emit lights of different colors correspond to one light emitting section, colors of the emission pattern lights emitted from the light emitting section can be changed.

The present invention can be used in the decorative component for a vehicle such as a grille, a garnish, car interior ornaments, or the like.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A decorative component for a vehicle comprising:
a plurality of light source sections that include a first light source section and a second light source section;
a housing configured to hold the plurality of light source sections; and
a light guide member that has a first surface and a second surface which face each other and that is configured to guide light emitted from the plurality of light source sections thereinto;
wherein a plurality of light emitting sections that include a first light emitting section and a second light emitting section are provided on the second surface of the light guide member, the plurality of light emitting sections being configured to emit light guided through the light guide member from the first surface as emission pattern light having a predetermined shape,
a first pattern forming section is constituted by the first light source section and the first light emitting section that correspond to each other and a second pattern forming section is constituted by the second light source section and the second light emitting section that correspond to each other,
in the first pattern forming section, the first light emitting section reflects the light emitted from the corresponding first light source section, and
in the second pattern forming section, the second light emitting section reflects the light emitted from the corresponding second light source section,
wherein the light emitting section of each of the pattern forming sections is constituted by a plurality of cut sections formed on the second surface, and
the plurality of cut sections have reflecting surfaces configured to reflect the light emitted from the corresponding light source section toward the first surface,
wherein each of the reflecting surfaces of the plurality of cut sections are directed to face the corresponding light source section, and
directions in which each of the reflecting surfaces of the plurality of cut sections and the corresponding light source section face each other are different from each other for each of the pattern forming sections,
wherein the first light emitting section and the second light emitting section are configured to be exposed to light from both the first light source section and second light source section, while the first light emitting section is configured to reflect light from only the first light source section and the second light emitting section is configured to reflect light from only the second light source section.

2. The decorative component for a vehicle according to claim 1, wherein,
when the light guide member is seen in a surface normal direction of the first surface in a plan view, shapes of the emission pattern lights are different from each other, the emission pattern lights being emitted from the light emitting sections for each of the pattern forming sections.

3. The decorative component for a vehicle according to claim 1, wherein,
when the light guide member is seen in a surface normal direction of the first surface in a plan view, at least two of the emission pattern lights have the same shape, the emission pattern lights being emitted from the light emitting section for each of the pattern forming sections.

4. The decorative component for a vehicle according to claim 1, further comprising a formed object disposed on an emission side of the light guide member,
wherein, when the light guide member is seen in a surface normal direction of the first surface in a plan view, the plurality of light emitting sections are disposed at positions adjacent to the formed object.

5. The decorative component for a vehicle according to claim 1, wherein
each cut section of the first light emitting section has a first longitudinal axis, and each cut section of the second light emitting section has a second longitudinal axis, and each light source of the first light source section has a first light emitting axis, and each light source of the second light source section has a second light emitting axis, wherein the first longitudinal axis is perpendicular to the first light emitting axis and the second longitudinal axis is perpendicular to the second light emitting axis.

6. The decorative component for a vehicle according to claim 1, wherein
each of the plurality of cut sections has a triangular pyramidal shape or a polygonal pyramidal shape with bases of four or more sides, and a surface of the triangular pyramidal shape or a polygonal pyramidal shape consists each of the plurality of cut sections.

7. The decorative component for a vehicle according to claim 1, wherein
a first cut section and a second cut section have different depths.

8. The decorative component for a vehicle according to claim 1, wherein the second surface is flat and located in a single plane.

9. A decorative component for a vehicle comprising:
a plurality of light source sections that include a first light source section and a second light source section;
a housing configured to hold the plurality of light source sections; and
a light guide member that has a first surface and a second surface which face each other and that is configured to guide light emitted from the plurality of light source sections thereinto;
wherein a plurality of light emitting sections that include a first light emitting section and a second light emitting section are provided on the second surface of the light guide member, the plurality of light emitting sections being configured to emit light guided through the light guide member from the first surface as emission pattern light having a predetermined shape,
a first pattern forming section is constituted by the first light source section and the first light emitting section that correspond to each other and a second pattern forming section is constituted by the second light source section and the second light emitting section that correspond to each other,
in the first pattern forming section, the first light emitting section reflects the light emitted from the corresponding first light source section,
in the second pattern forming section, the second light emitting section reflects the light emitted from the corresponding second light source section,
the light emitting section of each of the pattern forming sections is constituted by a plurality of cut sections formed on the second surface,
the plurality of cut sections have reflecting surfaces configured to reflect the light emitted from the corresponding light source section toward the first surface,
each of the reflecting surfaces of the plurality of cut sections is directed to face the corresponding light source section,
directions in which each of the reflecting surfaces of the plurality of cut sections and the corresponding light source section face each other are different from each other for each of the pattern forming sections, and
wherein each cut section of the first light emitting section has a first longitudinal axis, and each cut section of the second light emitting section has a second longitudinal axis, and each light source of the first light source section has a first light emitting axis, and each light source of the second light source section has a second light emitting axis, wherein the first longitudinal axis is perpendicular to the first light emitting axis and the second longitudinal axis is perpendicular to the second light emitting axis.

10. The decorative component for a vehicle according to claim 9, wherein,
when the light guide member is seen in a surface normal direction of the first surface in a plan view, shapes of the emission pattern lights are different from each other, the emission pattern light being emitted from the light emitting sections for each of the pattern forming sections.

11. The decorative component for a vehicle according to claim 9, wherein,
when the light guide member is seen in a surface normal direction of the first surface in a plan view, at least two of the emission pattern lights have the same shape, the emission pattern light being emitted from the light emitting section for each of the pattern forming sections.

12. The decorative component for a vehicle according to claim 9, further comprising:
a formed object disposed on an emission side of the light guide member, and
wherein, when the light guide member is seen in a surface normal direction of the first surface in a plan view, the plurality of light emitting sections are disposed at positions adjacent to the formed object.

13. The decorative component for a vehicle according to claim 9, wherein
each of the plurality of cut sections has a triangular pyramidal shape or a polygonal pyramidal shape with bases of four or more sides, and a surface of the triangular pyramidal shape or a polygonal pyramidal shape consists each of the plurality of the cut sections.

14. The decorative component for a vehicle according to claim 9, wherein
a first cut section and a second cut section of the plurality of cut sections have different depths.

15. The decorative component for a vehicle according to claim 9, further comprising:
a formed object disposed on an emission side of the light guide member,
wherein the formed object has a substantially rectangular frame shape which includes a first side and a second side that extend in a direction in which the first light source is extending and a third side and a fourth side that extend in a direction in which the second light source is extending, the first side being closer to the first light source than the second side, the third side being closer to the second light source than the fourth side,
the first light emitting section is provided at an outer region of the first side of the frame shape and at an inner region of the second side of the frame shape, and the second light emitting section is provided at an outer region of the third side of the frame shape and at an inner region of the fourth side of the frame shape.

16. The decorative component for a vehicle according to claim 15, wherein
the light guide member has a substantially rectangular shape, and
a third light source is provided at a corner of the light guide member.

* * * * *